(12) United States Patent
Friedrich et al.

(10) Patent No.: US 10,409,750 B2
(45) Date of Patent: Sep. 10, 2019

(54) OBTAINING OPTICAL SIGNAL HEALTH DATA IN A STORAGE AREA NETWORK

(71) Applicant: International Business Machines Corporation, Armonk, NY (US)

(72) Inventors: Ralph Friedrich, Boeblingen (DE); Raymond M. Higgs, Poughkeepsie, NY (US); George P. Kuch, Poughkeepsie, NY (US); Elizabeth A. Moore, San Jose, CA (US); Richard M. Sczepczenski, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 15/206,563

(22) Filed: Jul. 11, 2016

(65) Prior Publication Data

US 2018/0011808 A1    Jan. 11, 2018

(51) Int. Cl.
*G06F 3/06* (2006.01)
*G06F 13/38* (2006.01)
*G06F 13/40* (2006.01)
*G06F 13/42* (2006.01)
*G06F 9/455* (2018.01)

(52) U.S. Cl.
CPC .......... *G06F 13/385* (2013.01); *G06F 3/0619* (2013.01); *G06F 9/45533* (2013.01); *G06F 13/4022* (2013.01); *G06F 13/4282* (2013.01); *G06F 9/455* (2013.01); *G06F 2009/45595* (2013.01)

(58) Field of Classification Search
CPC .. G06F 3/0653; G06F 3/0607; G06F 2201/87; G06F 11/3409; G06F 11/324; G06F 3/0619; G06F 9/45533; G06F 9/455; G06F 2009/45595
See application file for complete search history.

(56) References Cited

U.S. PATENT DOCUMENTS 7,839,766 B1    11/2010 Gardner
8,555,275 B1    10/2013 Gokhale et al.
(Continued)

FOREIGN PATENT DOCUMENTS

EP    1674982 A    6/2006

OTHER PUBLICATIONS

List of IBM Patents or Patent Applications Treated as Related; (Appendix P), Filed Jul. 12, 2016, 2 pages.
(Continued)

*Primary Examiner* — Ernest Unelus
(74) *Attorney, Agent, or Firm* — Cantor Colburn LLP; William Kinnaman

(57) ABSTRACT

An aspect of obtaining optical signal health data in a SAN includes receiving, by a computer processor, a request for data corresponding to current operational characteristics of elements of a storage area network to which a host system computer has access. A further aspect includes instantiating, by the computer processor, a virtual host bus adapter interface on the host system computer, transmitting, via the virtual host bus adapter interface, the request to the elements in the portion of the storage area network, aggregating data received from each of the elements, and displaying the aggregated data via the computer processor.

17 Claims, 3 Drawing Sheets

(56) References Cited

U.S. PATENT DOCUMENTS

| | | |
|---|---|---|
| 2002/0129230 A1 | 9/2002 | Albright et al. |
| 2006/0182041 A1 | 8/2006 | Graves |
| 2008/0168161 A1 | 7/2008 | Lucas et al. |
| 2013/0138836 A1 | 5/2013 | Cohen et al. |
| 2014/0047139 A1 | 2/2014 | Okita |
| 2014/0059187 A1 | 2/2014 | Rosset et al. |
| 2014/0089735 A1 | 3/2014 | Barrett et al. |
| 2014/0157046 A1 | 6/2014 | Anumalasetty et al. |
| 2015/0195366 A1 | 7/2015 | Otsuka et al. |
| 2015/0261713 A1 | 9/2015 | Kuch et al. |
| 2016/0134493 A1* | 5/2016 | Susarla ............... H04L 67/1097 709/224 |

OTHER PUBLICATIONS

Ralph Friedrich, et al., Pending U.S. Appl. No. 15/206,514 entitled "Validating Virtual Host Bus Adapter Fabric Zoning in a Storage Area Network," filed Jul. 11, 2016.

Vmware, "Deployment Guide: Emulex Virtual HBA Solutions and VMware vSphere 4" Emulex, Mar. 2014, 14 pages.

Disclosed Anonymously, "Method and apparatus to determine Storage usage Backend Mapping by applications on Software Defined Storage Systems", IP.com No. IPCOM000240938D, Publication Date: Mar. 12, 2015; 12 pages.

IBM, "A Feature for Selecting the Data Source of a Fabric ZoneSets Database from Multiple Types of Data Sources", IP.com No. IPCOM000146275D, Publication Date: Feb. 9, 2007; 3 pages.

\* cited by examiner

OBTAINING OPTICAL SIGNAL HEALTH DATA IN A STORAGE AREA NETWORK

STATEMENT REGARDING PRIOR DISCLOSURE BY THE INVENTORS

The following disclosure(s) are submitted under 35 U.S.C. § 102(b)(1)(A): DISCLOSURE: Expanding the IBM Systems' portfolio with additions to IBM z Systems and IBM LinuxONE, Feb. 16, 2016.

BACKGROUND

The present disclosure relates to computer networks, and more specifically, to methods, systems and computer program products for obtaining optical signal health data in a storage area network (SAN).

SUMMARY

In accordance with an embodiment, a method for obtaining optical signal health data in a SAN is provided. The method includes receiving, by a computer processor, a request for data corresponding to current operational characteristics of elements of a storage area network to which a host system computer has access. The method also includes instantiating, by the computer processor, a virtual host bus adapter interface on the host system computer and transmitting, via the virtual host bus adapter interface, the request to the elements in the portion of the storage area network. The method further includes aggregating data received from each of the elements, and displaying the aggregated data via the computer processor.

In accordance with an embodiment, a system for obtaining optical signal health data in a SAN is provided. The system includes a memory having computer readable instructions, and a processor for executing the computer readable instructions. The computer readable instructions include receiving a request for data corresponding to current operational characteristics of elements of a storage area network to which a host system computer has access, instantiating a virtual host bus adapter interface on the host system computer, and transmitting, via the virtual host bus adapter interface, the request to the elements in the portion of the storage area network. The computer readable instructions also include aggregating data received from each of the elements, and displaying the aggregated data via the processor.

In accordance with an embodiment, a computer program product for obtaining optical signal health data in a SAN is provided. The computer program product includes a computer readable storage medium having program instructions embodied therewith, wherein the computer readable storage medium is not a transitory signal per se. The program instructions are executable by a computer processor to cause the computer processor to perform a method. The method includes receiving a request for data corresponding to current operational characteristics of elements of a storage area network to which a host system computer has access, instantiating a virtual host bus adapter interface on the host system computer, and transmitting, via the virtual host bus adapter interface, the request to the elements in the portion of the storage area network. The method also includes aggregating data received from each of the elements, and displaying the aggregated data via the computer processor.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for obtaining optical signal health data in a SAN are provided. A SAN refers to a collection of storage devices that are communicatively interconnected to enable shared use of their resources. Optical signal health is important to efficient operation of a SAN. Malfunctioning or marginal optic transceivers, as well as poor connectors and faulty fiber optic cables, can severely limit data throughput by invoking operation retries and recovery. Providing data for operational characteristics of end points in the SAN can expedite problem diagnosis and resolution. The embodiments described herein provide the ability to allow a user or administrator to query the optical characteristics of elements in a SAN to assess any performance issues that may arise. In addition, the embodiments enable the identification of the location or point in the pathway of the network in which an error or issue is detected. These, and other aspects of the embodiments will now be described.

Figure 1:
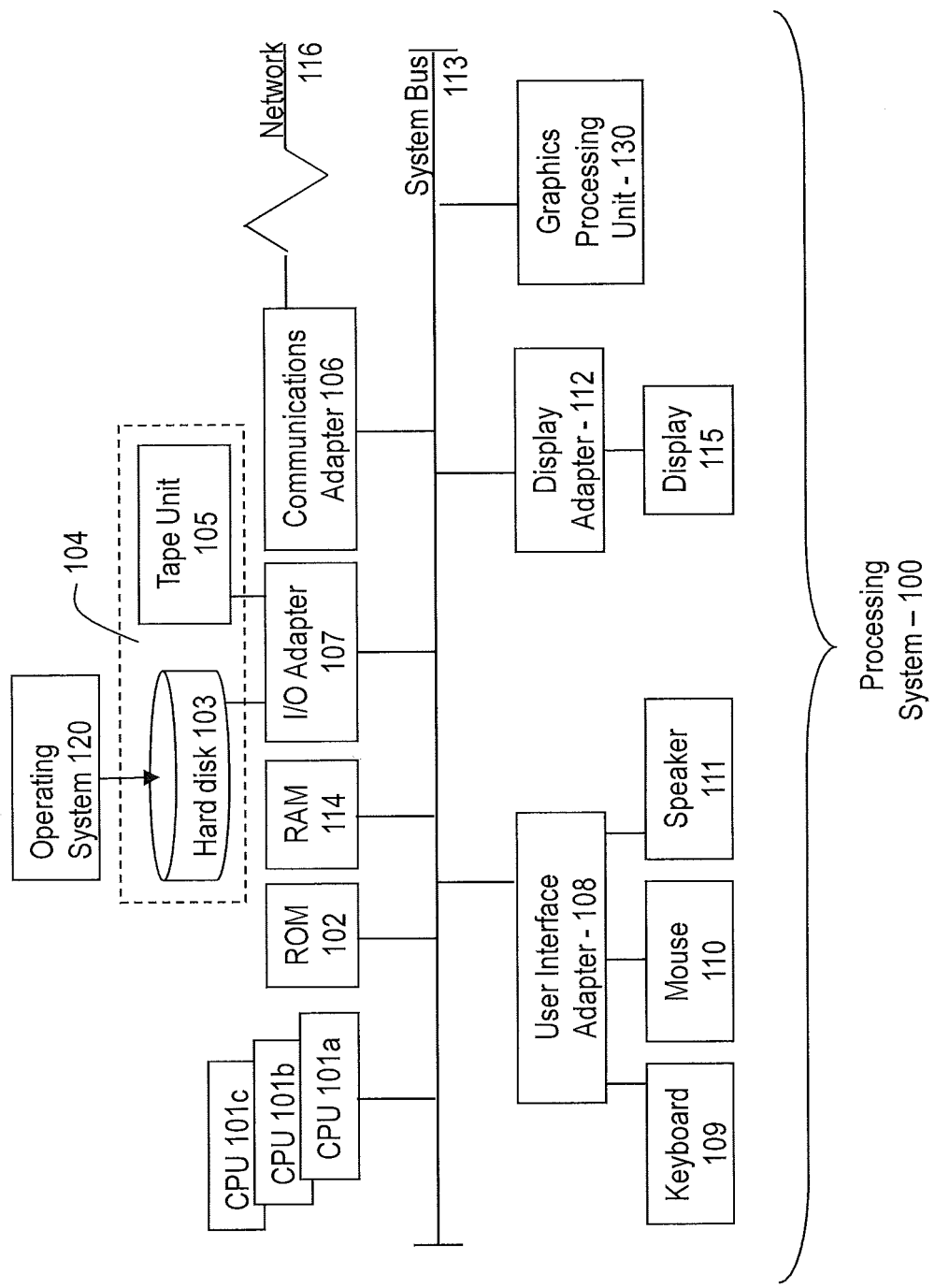
FIG. 1 is a block diagram illustrating one example of a processing system in accordance with an embodiment.

Referring to FIG. 1, there is shown an embodiment of a processing system 100 for implementing the teachings herein in accordance with an embodiment. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
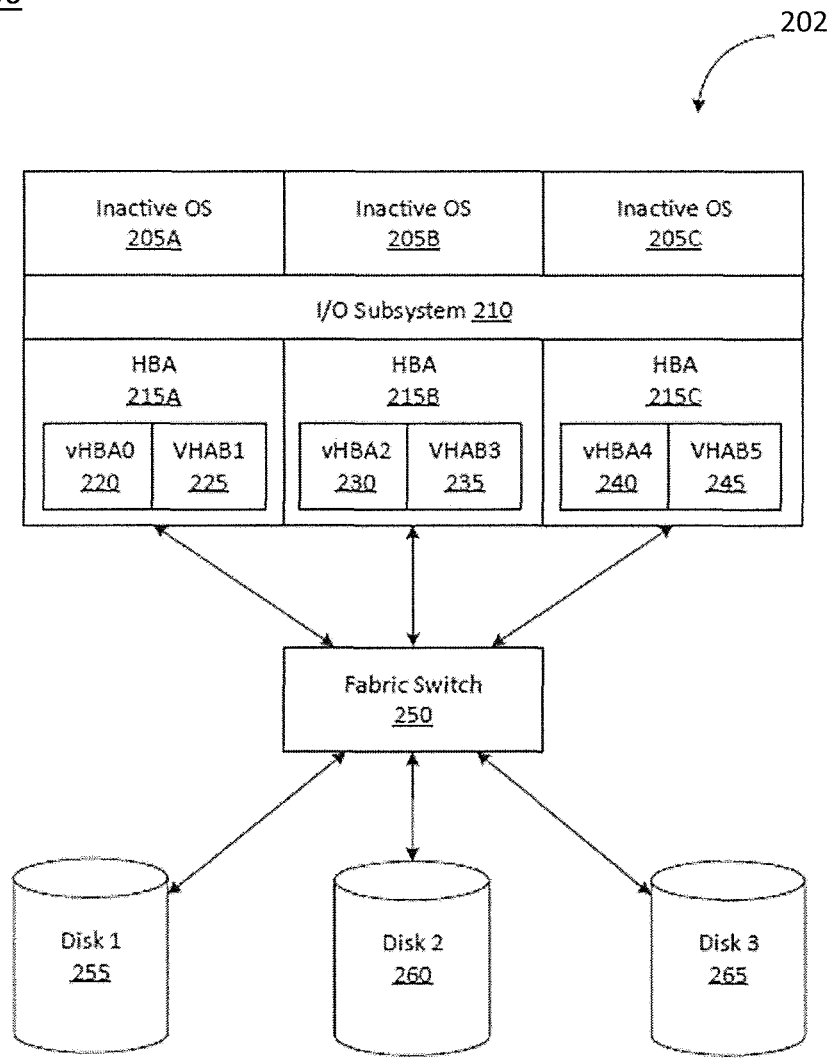
FIG. 2 is a block diagram illustrating a more detailed example of a processing system in accordance with an embodiment.

Turning now to FIG. 2, a block diagram illustrating a more detailed example of a processing system for practice of the teachings herein will now be described in an embodiment. The processing system of FIG. 2 illustrates a sample SAN 200 that includes a host system computer 202, a fabric switch 250, and disk drives 255, 260, and 265. An operating system of the host system computer 202 is virtualized to represent respective inactive operating systems (OSs) 205A-205C. An inactive OS can occur in several forms, such as an OS that is installed but not booted, a provisioned resource on host system that is not installed, or a booted OS that is suspended. The OSs 205A-205C communicate with corresponding host bus adapters (HBAs) 215A-215C through an input/output (I/O) subsystem 210. Each of HBAs 215A-215C represents a physical host bus adapter with related circuitry that facilitates data transfer between the host system computer 202 and other network elements, such as switch 250, and disks 255, 260, and 265. Each HBA 215A-215C initiates and sends service task management requests to target devices (e.g., disks 255, 260, and 265) in the SAN 200. In a virtualized environment, each HBA 215A, 215B, and 215C implements multiple virtual HBAs (vHBAs), which are illustrated in FIG. 2 as vHBAs 220, 225, 230, 235, 240, and 245, respectively. Each vHBA is separately and independently addressable by network elements in the SAN 200.

Each disk drive 255, 260, and 265 may contain multiple disk arrays, and may be configured with multiple ports that are addressable by one or more network elements. The switch 250 is a hardware device that enables multiple hosts to communicate with multiple disks. The host system computer 202, switch 250, and disks 255, 260, and 265 are communicatively coupled using fiber optic cables and transceivers (not shown).

For ease of description, the SAN 200 described in FIG. 2 illustrates a simplified embodiment of the network elements that may reside therein. It is understood that the SAN 200 may incorporate multiple host system computers, switches, and storage devices.

Figure 3:
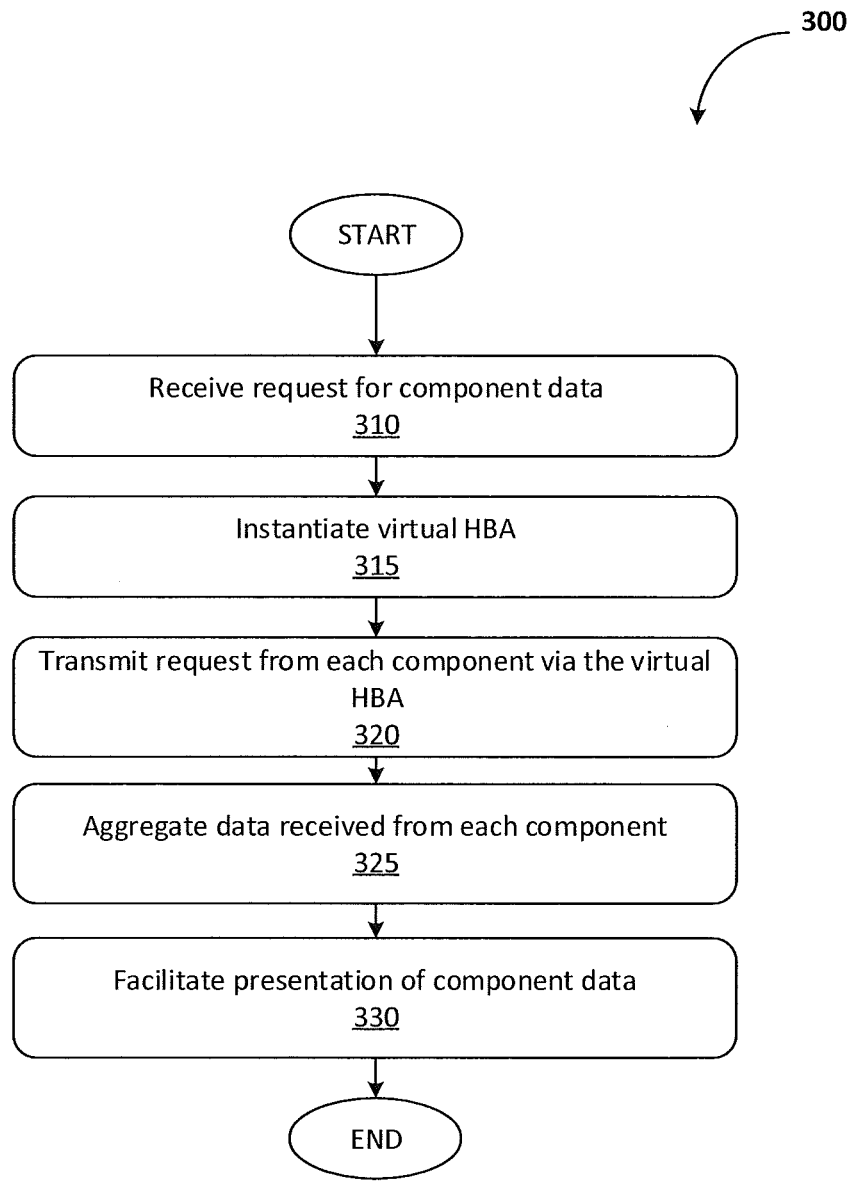
FIG. 3 is a block diagram illustrating a method for obtaining optical signal health data in a SAN in accordance with an exemplary embodiment.

FIG. 3 is a block diagram illustrating a method for obtaining optical signal health data in a SAN in accordance with an embodiment. The process 300 begins when a user desires to obtain information about the operating characteristics of elements of a SAN to which a host system computer in the SAN has access. The access to the elements in the SAN may be pre-assigned by a system administrator, e.g. via an access control system. The user may request this information to determine or assess the health of the elements in the network.

In block 310, the host system computer receives a request for component data. As described herein, the component data corresponds to current operational characteristics of elements in the SAN to which the host system computer has been given access. The elements may include one or more storage arrays, switches, transceivers, and optical fiber connections that reside in a pathway between an initiator (e.g., an entity of the host system computer) and a target device (e.g., a disk drive).

In block 315, a processor of the host system computer instantiates a virtual host bus adapter on the host system computer absent a boot of the operating system, which otherwise is needed to activate a virtual host bus adapter on a physical host bus adapter (and from said operating system a request to the virtual host bus adapter would be issued). In an embodiment, the processor may form part of a physical host bus adapter.

In block 320, the request is transmitted to each of the corresponding elements. In an embodiment, the virtual host bus adapter identifies each of the elements in the storage area network to which the host system computer has access based on address data corresponding to ports of the elements that are assigned for use/access by the host system computer.

The data collected from these elements may include transmitter optical power, receiver optical power, voltage, transmitter bias, transmitter type, transceiver speed capabilities, and established transceiver speed, as well as temperature data and error statistics.

In block 325, the data received from the elements is aggregated and, in block 330, the aggregated data is displayed for the user, e.g., on the host system computer.

Once this information is available, it can be determined which if any of the elements are not performing at optimal levels or are beginning to fail. Corrective actions may include replacement or repair of one or more suspected elements. In an embodiment, the user may determine whether any implemented repair was successful by re-invoking the request for data and comparing the data values before and after the repair takes place.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving, by a computer processor of a host system computer, a request for data corresponding to current operational characteristics of elements of a storage area network to which a virtual bus adapter interface in the host system computer has access, wherein the host system computer includes a physical host bus adapter that is connected to an inactive operating system of the host system computer, where the physical host bus adapter is connected to a plurality of virtual host bus adapter interfaces;
    instantiating, by the computer processor of the host system computer, a virtual host bus adapter interface of the plurality of virtual host bus adapters without booting the inactive operating system that is associated with the physical host bus adapter;
    transmitting, via the virtual host bus adapter interface, the request to the elements in a portion of the storage area network;

aggregating data received from each of the elements; and
displaying the aggregated data via the computer processor.

2. The computer-implemented method of claim 1, wherein the computer processor is implemented by a physical host bus adapter.

3. The computer-implemented method of claim 1, wherein the elements include at least two of a storage array, switch, transceiver, and optical fiber identified in a pathway between an initiator and a target device.

4. The computer-implemented method of claim 1, wherein the transmitting the request to the elements via the virtual host bus adapter interface is implemented absent engagement between the operating system and the physical host bus adapter.

5. The computer-implemented method of claim 1, further comprising:
re-invoking the request for data corresponding to current operational characteristics of elements of the storage area network, and comparing response data received with the aggregated data to verify success of any corrective action taken for one or more of the elements.

6. The computer-implemented method of claim 1, further comprising:
identifying each of the elements in the storage area network to which the host system computer has access based on address data corresponding to ports of the elements that are assigned to the host system computer;
wherein the request is transmitted to the elements in the storage area network based on the address data.

7. A host computer system, comprising:
a memory having computer readable instructions; and
a processor for executing the computer readable instructions, the computer readable instructions including:
receiving a request for data corresponding to current operational characteristics of elements of a storage area network to which a virtual bus adapter interface in the host system computer has access, wherein the host system computer includes a physical host bus adapter that is connected to an inactive operating system of the host system computer, where the physical host bus adapter is connected to a plurality of virtual host bus adapter interfaces;
instantiating a virtual host bus adapter interface of the plurality of virtual host bus adapters without booting the inactive operating system that is associated with the physical host bus adapter;
transmitting, via the virtual host bus adapter interface, the request to the elements in a portion of the storage area network;
aggregating data received from each of the elements; and
displaying the aggregated data via the processor.

8. The host computer system of claim 7, wherein the processor is implemented by a physical host bus adapter.

9. The host computer system of claim 7, wherein the elements include at least two of a storage array, switch, transceiver, and optical fiber identified in a pathway between an initiator and a target device.

10. The host computer system of claim 7, wherein the transmitting the request to the elements via the virtual host bus adapter interface is implemented absent engagement between the operating system and the physical host bus adapter.

11. The host computer system of claim 7, wherein the computer readable instructions further include:
re-invoking the request for data corresponding to current operational characteristics of elements of the storage area network, and comparing response data received with the aggregated data to verify success of any corrective action taken for one or more of the elements.

12. The host computer system of claim 7, wherein the computer readable instructions further include:
identifying each of the elements in the storage area network to which the host system computer has access based on address data corresponding to ports of the elements that are assigned to the host system computer;
wherein the request is transmitted to the elements in the storage area network based on the address data.

13. A computer program product comprising a computer readable storage medium having program instructions embodied therewith, wherein the computer readable storage medium is not a transitory signal per se, the program instructions executable by a computer processor to cause the computer processor to perform a method, comprising:
receiving a request for data corresponding to current operational characteristics of elements of a storage area network to which a virtual bus adapter interface in the host system computer has access, wherein the host system computer includes a physical host bus adapter that is connected to an inactive operating system of the host system computer, where the physical host bus adapter is connected to a plurality of virtual host bus adapter interfaces;
instantiating a virtual host bus adapter interface of the plurality of virtual host bus adapters without booting the inactive operating system that is associated with the physical host bus adapter;
transmitting, via the virtual host bus adapter interface, the request to the elements in a portion of the storage area network;
aggregating data received from each of the elements; and
displaying the aggregated data via the computer processor.

14. The computer program product of claim 13, wherein the computer processor is implemented by a physical host bus adapter.

15. The computer program product of claim 13, wherein the elements include at least two of a storage array, switch, transceiver, and optical fiber identified in a pathway between an initiator and a target device.

16. The computer program product of claim 13, wherein the transmitting the request to the elements via the virtual host bus adapter interface is implemented absent engagement between the operating system and the physical host bus adapter.

17. The computer program product of claim 13, wherein the program instructions executable by a computer processor further cause the computer processor to perform:
re-invoking the request for data corresponding to current operational characteristics of elements of the storage area network, and comparing response data received with the aggregated data to verify success of any corrective action taken for one or more of the elements.

* * * * *